US012263601B2

(12) United States Patent
Yoshida

(10) Patent No.: US 12,263,601 B2
(45) Date of Patent: Apr. 1, 2025

(54) ANGLE CALIBRATION METHOD

(71) Applicant: KAWASAKI JUKOGYO KABUSHIKI KAISHA, Kobe (JP)

(72) Inventor: Terumasa Yoshida, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 275 days.

(21) Appl. No.: 18/008,301

(22) PCT Filed: Jun. 4, 2021

(86) PCT No.: PCT/JP2021/021386
§ 371 (c)(1),
(2) Date: Dec. 5, 2022

(87) PCT Pub. No.: WO2021/246521
PCT Pub. Date: Dec. 9, 2021

(65) Prior Publication Data
US 2023/0173680 A1 Jun. 8, 2023

(30) Foreign Application Priority Data
Jun. 5, 2020 (JP) ................. 2020-098368

(51) Int. Cl.
*B25J 9/16* (2006.01)
*G01B 5/14* (2006.01)
(52) U.S. Cl.
CPC ........... *B25J 9/1692* (2013.01); *B25J 9/1664* (2013.01); *G01B 5/14* (2013.01)
(58) Field of Classification Search
CPC ......... B25J 9/1692; B25J 9/1664; G01B 5/14; G05B 2219/39024
See application file for complete search history.

(56) References Cited

U.S. PATENT DOCUMENTS

| 4,853,603 A * | 8/1989 | Onoue | G05B 19/42 |
| | | | 318/632 |
| 8,306,660 B2 * | 11/2012 | Ban | B25J 9/1692 |
| | | | 700/59 |

(Continued)

FOREIGN PATENT DOCUMENTS

| CN | 111145630 A | 5/2020 |
| JP | H02-117891 U | 9/1990 |

(Continued)

OTHER PUBLICATIONS

Jul. 6, 2021 International Search Report issued in Patent Application No. PCT/JP2021/021386.

*Primary Examiner* — Octavia Hollington
(74) *Attorney, Agent, or Firm* — Oliff PLC

(57) ABSTRACT

A robot includes an actuator that changes an angle of a second member relative to a first member in accordance with a command value. In a first step of an angle calibration method, a measurement object distance is obtained by measuring a distance between wall surfaces of the two measurement object portions, the measurement being made while the actuator is given an arbitrary command value. In a second step, an angular difference is obtained by calculation, the angular difference corresponding to a difference in distance between two measurement object portions, the calculation being made based on a reference measurement object distance obtained in the past and the measurement object distance obtained in the first step, the reference measurement object distance having been obtained by measuring the measurement object distance while the actuator was given an arbitrary command value.

11 Claims, 6 Drawing Sheets

(56) References Cited

U.S. PATENT DOCUMENTS

2011/0295421 A1    12/2011   Ban et al.
2017/0072562 A1*    3/2017   Kokubo ................ B25J 9/1638

FOREIGN PATENT DOCUMENTS

| | | | |
|---|---|---|---|
| JP | H04-034606 A | 2/1992 | |
| JP | H04300181 A * | 10/1992 | |
| JP | 2002239967 A * | 8/2002 | |
| JP | 2003-322501 A | 11/2003 | |
| JP | 2011-251365 A | 12/2011 | |
| JP | 2016-078173 A | 5/2016 | |
| JP | 2017-100202 A | 6/2017 | |
| WO | WO-2019215296 A2 * | 11/2019 | ............ B25J 9/1692 |

* cited by examiner

ANGLE CALIBRATION METHOD

TECHNICAL FIELD

The present invention relates to an angle calibration method for calibrating an angle of a robot.

BACKGROUND ART

Conventionally known is a robot having one or more joints. The robot has an actuator for rotating an arm, a hand, or the like, the actuator being arranged for every joint. The actuator is typically an electric motor.

Each actuator rotates an output shaft so as to achieve an angle corresponding to a command value received. In many cases, each actuator is, during assemblage, set so as to have an angle of 0° when the robot is in an origin-posture, which is predetermined.

To improve the position accuracy of a distal end portion of the robot, this origin alignment (angle calibration) is often performed by using large-scale equipment such as a laser tracker.

Patent Literature 1 (PTL 1) discloses: detecting a shift of an installation position and an installation posture of a work robot at a time of replacement of the work robot, by using a position measuring apparatus such as a laser tracker; and correcting teaching data to the degree corresponding to the shift.

CITATION LIST

Patent Literature

PTL 1: Japanese Patent Application Laid-Open No. 2016-78173

SUMMARY OF INVENTION

Technical Problem

A robot like the robot of PTL 1 may conceivably face a situation where after factory shipment, an electric motor has a fault, so that only a part corresponding to the electric motor needs replacement. In a case of replacing only a part, aside from a case of replacing the robot as a whole, it is difficult to use an expensive apparatus such as the laser tracker shown in PTL 1.

The present invention has been made in view of the foregoing circumstances, and aims to acquire a shift of a rotation angle in a robot with a high accuracy through a simple, easy, and quick operation, the shift being caused by, for example, replacement of an actuator in the robot.

Solution to Problem

The problem to be solved by the present invention is as above. The following describes solutions to the problem as well as advantageous effects thereof.

An aspect of the present invention provides an angle calibration method as follows. The angle calibration method is applied to a robot including a first member, a second member, and an actuator. The second member is coupled to the first member in a relatively rotatable manner. The actuator changes an angle of the second member relative to the first member in accordance with a command value. The angle calibration method includes a first step and a second step. In the first step, a measurement object distance, which is a distance between two measurement object portions including a first measurement object portion disposed in the first member and a second measurement object portion disposed in the second member, is obtained by measuring a distance between wall surfaces of the two measurement object portions, the measurement being made while the actuator is given an arbitrary command value. In the second step, an angular difference is obtained by calculation, the angular difference corresponding to a difference in distance between two measurement object portions, the calculation being made based on a reference measurement object distance obtained in the past and the measurement object distance obtained in the first step, the reference measurement object distance having been obtained by measuring the measurement object distance while the actuator was given an arbitrary command value.

With this, a command value to be given to the current actuator is adjusted based on the angular difference obtained, and thereby the angle of rotation of the second member rotated by the initial actuator can be reproduced with a good accuracy. It is possible to perform calibration just by measuring the distance between the wall surfaces of the measurement object portions, without any need to move the robot little by little. Thus, an improved operation efficiency can be obtained.

Advantageous Effects of Invention

According to the present invention, a shift of a rotation angle in a robot caused by, for example, replacement of an actuator can be acquired with a high accuracy through a simple, easy, and quick operation

DESCRIPTION OF EMBODIMENTS

Figure 1:
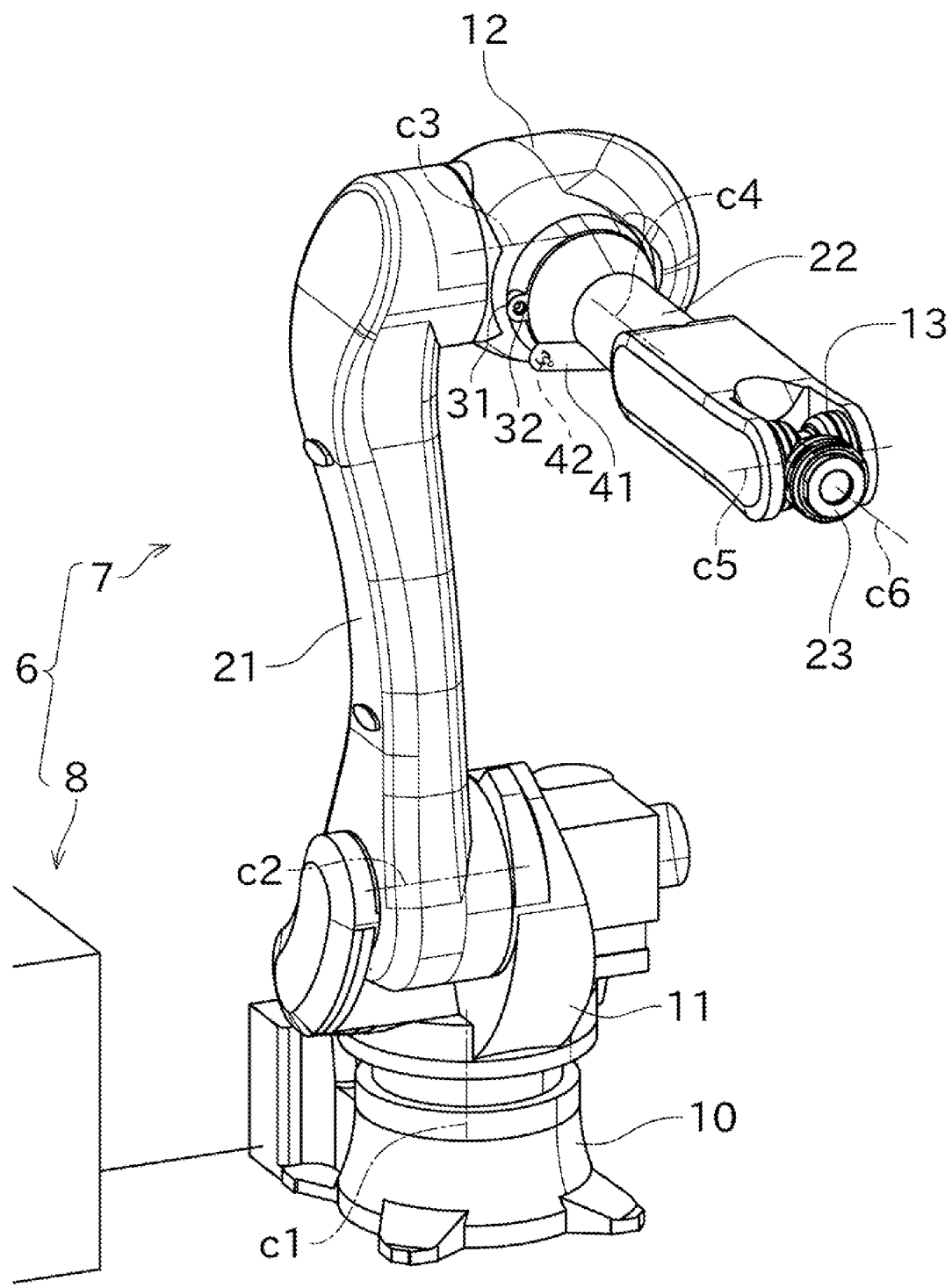
FIG. 1 A perspective view of an industrial robot according to an embodiment of the present invention FIG. 2 A perspective view showing pins being attached to a boss portion of a second joint body and to a boss portion of a second arm FIG. 3 A cross-sectional view showing a configuration of the pins and attachment holes in detail FIG. 4 A perspective view showing the two pins attached FIG. 5 A perspective view showing a vernier caliper put to the two pins for distance measurement FIG. 6 A schematic depiction for explanation of the relationship of a pin-to-pin distance and an angular difference

An embodiment of the present invention will now be described with reference to the drawings. FIG. 1 is a perspective view showing an industrial robot 6 according to an embodiment of the present invention.

The industrial robot (robot) 6 shown in FIG. 1 is configured as a vertical-type articulated robot having a degree of freedom of motion of six. The industrial robot 6 includes an arm part 7 and a controller 8. The arm part 7 is capable of performing predetermined operations by moving based on an instruction from the controller 8.

The arm part 7 includes a base stand 10, a first joint body 11, a first arm 21, a second joint body (first member) 12, a second arm (second member) 22, a third joint body 13, and a distal end portion 23.

The base stand 10, which is a member that functions as a foundation of the arm part 7, is fixed to a floor or the like.

The first joint body 11 is disposed above the base stand 10. The first joint body 11 is supported so as to be rotatable about a vertical axis (rotation axis c1) relative to the base stand 10.

The first arm 21 is configured as an elongated member. The first arm 21 has one longitudinal end portion supported rotatably by the first joint body 11. A rotation axis c2 about which the first arm 21 rotates relative to the first joint body 11 is located in a plane that is perpendicular to the rotation axis of the first joint body 11.

The second joint body 12 is configured as a block-shaped member. The second joint body 12 is rotatably supported by a distal end portion of the first arm 21. A rotation axis c3 about which the second joint body 12 rotates relative to the first arm 21 is arranged in parallel to the rotation axis c2 about which the first arm 21 rotates relative to the first joint body 11.

The second arm 22 is configured as an elongated member. The second arm 22 is supported by the second joint body 12. The second arm 22 is rotatable about an axis (rotation axis c4) extending along the longitudinal direction of the second arm 22.

The third joint body 13 is rotatably supported by a distal end portion of the second arm 22. A rotation axis c5 about which the third joint body 13 rotates relative to the second arm 22 is located in a plane that is perpendicular to the rotation axis about which the second arm 22 rotates relative to the second joint body 12.

The distal end portion 23 is rotatably supported by the third joint body 13. A rotation axis c6 about which the distal end portion 23 rotates relative to the third joint body 13 is located in a plane that is perpendicular to the rotation axis c5 about which the third joint body 13 rotates relative to the second arm 22.

The controller 8 is installed near the base stand 10. The controller 8 is capable of making the arm part 7 move appropriately, by transmitting electric signals to electric motors (actuators), each of which is provided for each of the above-mentioned rotation axes set in the arm part 7.

The electric motors, which are controlled by the controller 8, include an electric motor for rotating the second arm 22 relative to the second joint body 12, though not shown.

When the industrial robot 6 having the above-described configuration is installed at a factory or the like, the industrial robot 6 is subjected to an operation called origin alignment. The origin alignment is also called zeroing. In the origin alignment, an angle calibration is performed such that each electric motor has an angle of 0° when the robot is in an origin-posture, which is predetermined.

The origin alignment may be performed by using, for example, a laser tracker like the one shown in PTL 1. A method for the origin alignment is well-known, and thus a description of the method is omitted herein. The origin alignment, in which each electric motor is given a command value indicating an angle of 0°, allows the industrial robot 6 to achieve the above-mentioned origin-posture with a high accuracy.

Figure 2:
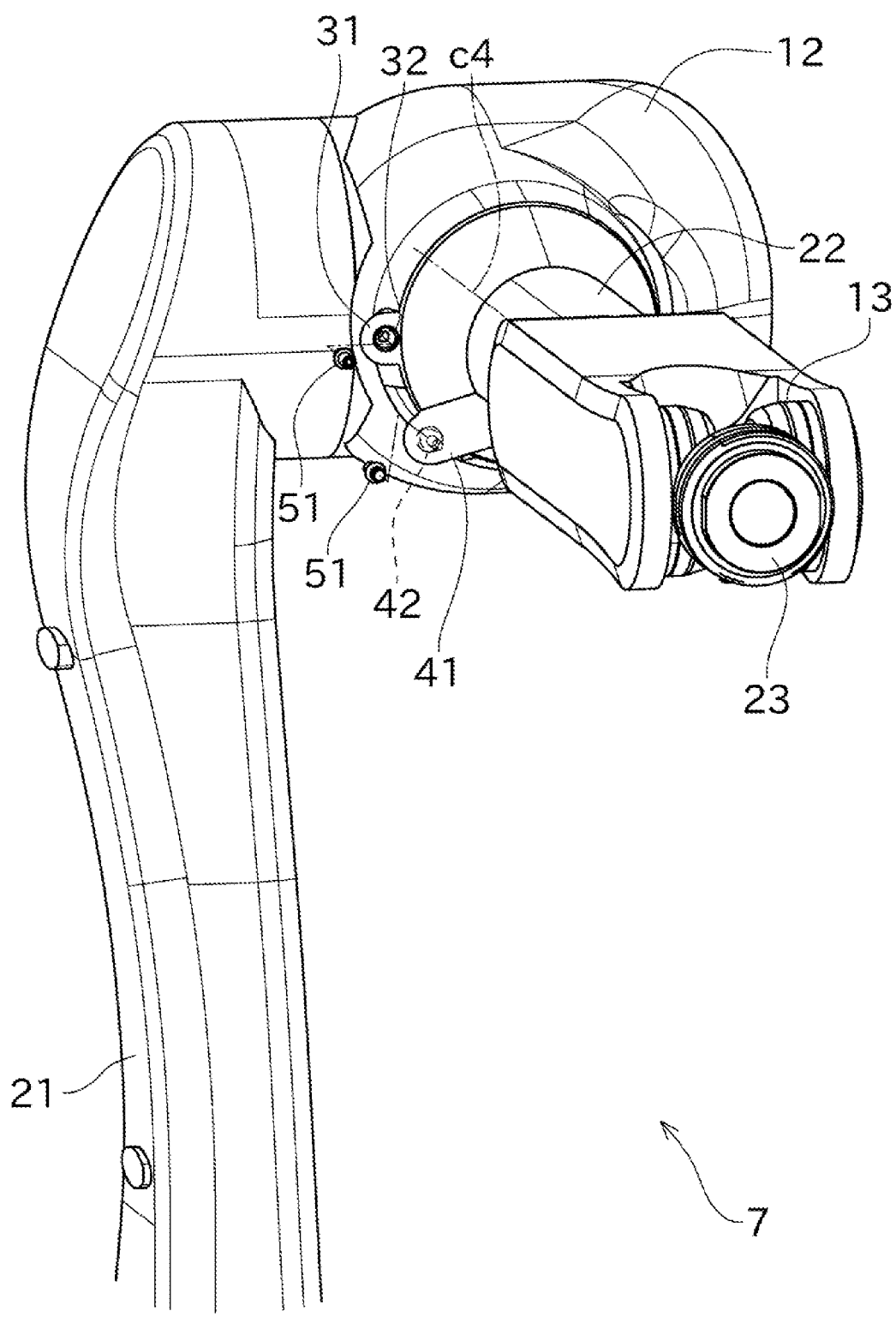
Figure 5:
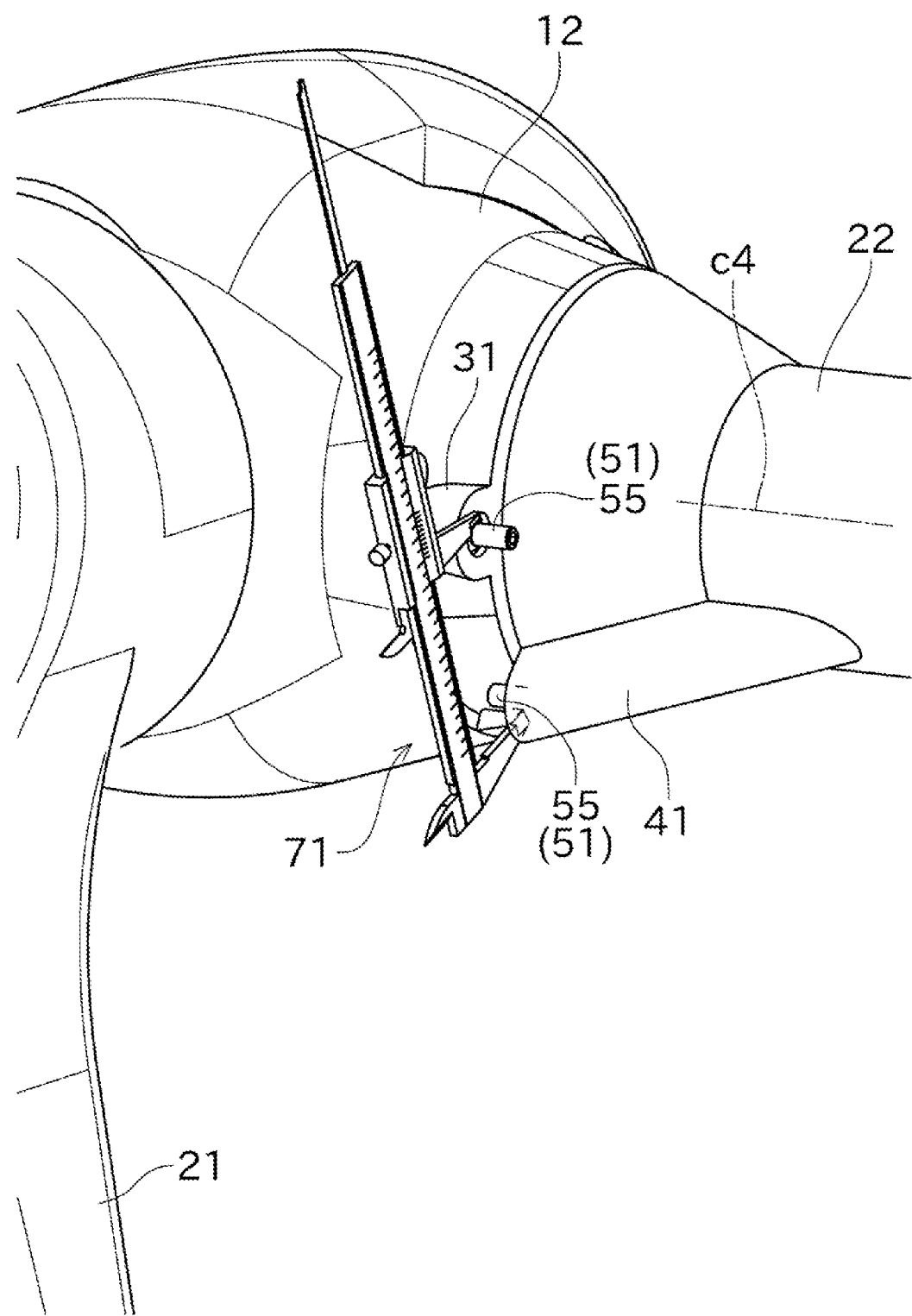

There is a possibility of a potential abnormality in each electric motor (for example, in the electric motor for rotating the second arm 22 relative to the second joint body 12), after running of the industrial robot 6 is started. In this embodiment, therefore, two pins 51 are attached to the arm part 7 as shown in FIG. 2 at a timing immediately after the origin alignment for example, and the distance between the two pins 51 is measured in advance as shown in FIG. 5.

The pins 51 function as marks indicating predetermined positions in the second joint body 12 and in the second arm 22, respectively. The marks, in other words, may be called measurement object portions. The two pins 51 also function as removable jigs that are used to allow a vernier caliper 71 shown in FIG. 5 to precisely measure the mark-to-mark distance. A result of this measurement is used later for origin re-alignment (angle calibration) in a case of breakdown and replacement of the electric motor, for example.

More specifically, the second joint body 12 has a boss portion 31 used to attach the pin 51 removably. The boss portion 31, which is formed integrally with the second joint body 12, is provided in a portion of the second joint body 12 so as to protrude in a direction away from the rotation axis c4, the portion being located near the second arm 22. The direction in which the boss portion 31 protrudes from the second joint body 12 can be paraphrased as the radial direction of a circle centered at the rotation axis c4.

The rotation axis c4 is a central axis about which the second arm 22 rotates relative to the second joint body 12. Thus, the rotation axis c4 can be considered as a joint axis of a joint that couples the second joint body 12 to the second arm 22.

The boss portion 31 has an attachment hole 32 used to attach the pin 51. The attachment hole 32 is formed as an elongated threaded hole. The axis of the attachment hole 32 extends in parallel to the rotation axis c4. The attachment hole 32 is open in a face of the boss portion 31, the face being at the side closer to the second arm 22.

The second arm 22 has a boss portion 41 used to attach the pin 51 removably. The boss portion 41, which is formed integrally with the second arm 22, is provided in a portion of the second arm 22 so as to protrude in a direction away from the rotation axis c4, the portion being located near the second joint body 12. The direction in which the boss portion 41 protrudes from the second arm 22 can be paraphrased as the radial direction of a circle centered at the rotation axis c4.

The boss portion 41 has an attachment hole 42 used to attach the pin 51. The attachment hole 42 is formed as an elongated threaded hole. The axis of the attachment hole 42 extends in parallel to the rotation axis c4. The attachment hole 42 is open in a face of the boss portion 41, the face being at the side closer to the second joint body 12.

Figure 3:
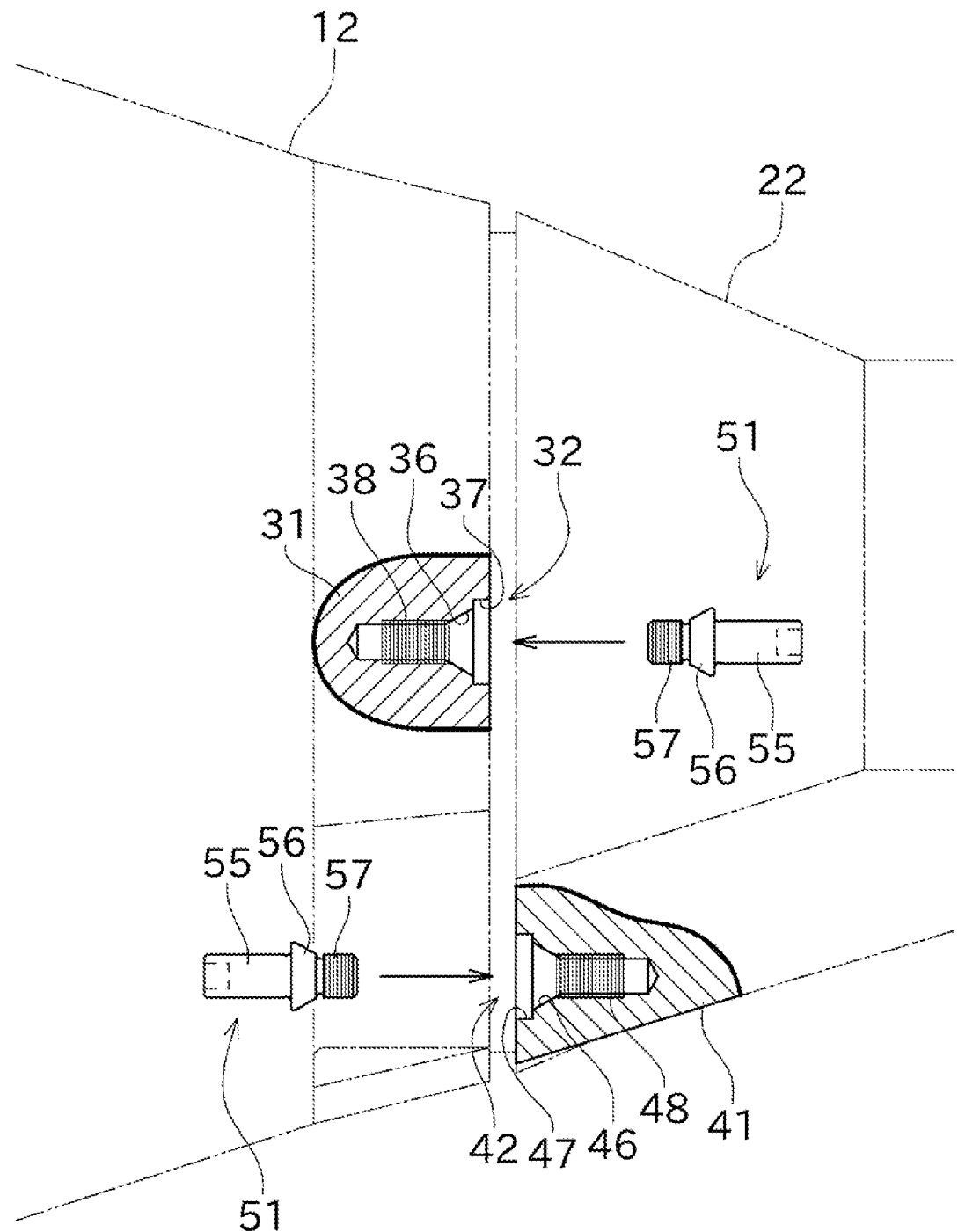

As shown in FIG. 3, the two attachment holes 32, 42 have the same shape. The two pins 51 have the same shape accordingly. This can reduce the processing cost and parts cost.

Each of the pins 51 is an elongated member having a rod-like shape. The pin 51 includes a column portion 55, a tapered portion 56, and a male thread portion 57. The column portion 55, the tapered portion 56, and the male thread portion 57 are formed integrally with one another.

The column portion 55 is a columnar portion that has been highly accurately processed to have a predetermined diameter. Attachment of the pin 51 to the second joint body 12 or the second arm 22 is in the direction parallel to the rotation axis c4, and therefore when the column portion 55 is cut in a plane perpendicular to the rotation axis c4, a resulting cross-section of the pin 51 has a circular contour. The column portion 55 is disposed in a longitudinal end portion of the pin 51. An end portion of the column portion 55 has a hexagonal hole that allows a tool for screwing the pin 51 to be inserted therein.

The tapered portion 56 is a collar-shaped portion connected to the column portion 55. The tapered portion 56 has a diameter larger than that of the column portion 55. The tapered portion 56 is in the shape of a truncated cone having a larger diameter at the side close to the column portion 55 and having a smaller diameter at the side farther from the column portion 55. The axis of the cone is precisely coincident with the axis of a column of the column portion 55.

The male thread portion 57 is a portion having a processed male thread. The male thread portion 57 is disposed in a longitudinal end portion of the pin 51 opposite to where the column portion 55 is disposed. The male thread portion 57 is connected to the tapered portion 56.

The attachment hole 32 disposed in the second joint body 12 has a tapered recess 36, a peripheral recess 37, and a female thread portion 38.

The tapered recess 36 has an inside diameter larger than that of the female thread portion 38. The tapered recess 36 is in the shape of a truncated cone having a larger diameter at the side close to the opening of the attachment hole 32 and having a smaller diameter at the side farther from the opening. The shape of the tapered recess 36 corresponds to the shape of the tapered portion 56 of the pin 51. The axis of the tapered recess 36 is disposed in parallel to the rotation axis c4. The axis of the tapered recess 36 is positioned precisely at a predetermined distance from the rotation axis c4.

The peripheral recess 37, which is in the shape of a large circle, has an appropriate depth, and is formed at the periphery of the opening of the tapered recess 36. Even if not whole of the tapered portion 56 of the pin 51 is received in the tapered recess 36 of the attachment hole 32, a portion of the tapered portion 56 not received in the tapered recess 36 is received in the peripheral recess 37. This can create a situation where only the column portion 55 substantially protrudes from the boss portion 31. As a result, measurement with the vernier caliper 71 which will be described later is facilitated.

The female thread portion 38 is a portion having a female thread. The female thread portion 38 is disposed at the side farther from the opening of the attachment hole 32 across the tapered recess 36, and is arranged adjacent to the tapered recess 36. To the female thread portion 38, the male thread portion 57 of the pin 51 can be threadedly coupled.

Like the attachment hole 32 disposed in the second joint body 12, the attachment hole 42 disposed in the second arm 22 has a tapered recess 46, a peripheral recess 47, and a female thread portion 48. The tapered recess 46, the peripheral recess 47, and the female thread portion 48 have the same configurations as those of the tapered recess 36, the peripheral recess 37, and the female thread portion 38 of the attachment hole 32.

The axis of the tapered recess 46 is disposed in parallel to the rotation axis c4. The axis of the tapered recess 46 is positioned precisely at a predetermined distance from the rotation axis c4. The axes of the tapered recesses 36, 46 in the two attachment holes 32, 42 are at equal distances from the rotation axis c4.

With the above-described configuration, the pin 51 is attached to the attachment hole 32 of the boss portion 31, and the pin 51 is attached to the attachment hole 42 of the boss portion 41. As the pins 51 are turned, the pins 51 are threadedly coupled and fixed to the attachment holes 32, 42. Operations for attaching/detaching the pins 51 are easy, therefore.

Screwing the thread of the pin 51 exerts an axis alignment effect on the tapered portion 56. This makes the axes of the pins 51 precisely coincident with the axes of the tapered recesses 36, 46 of the attachment holes 32, 42, respectively.

Figure 4:
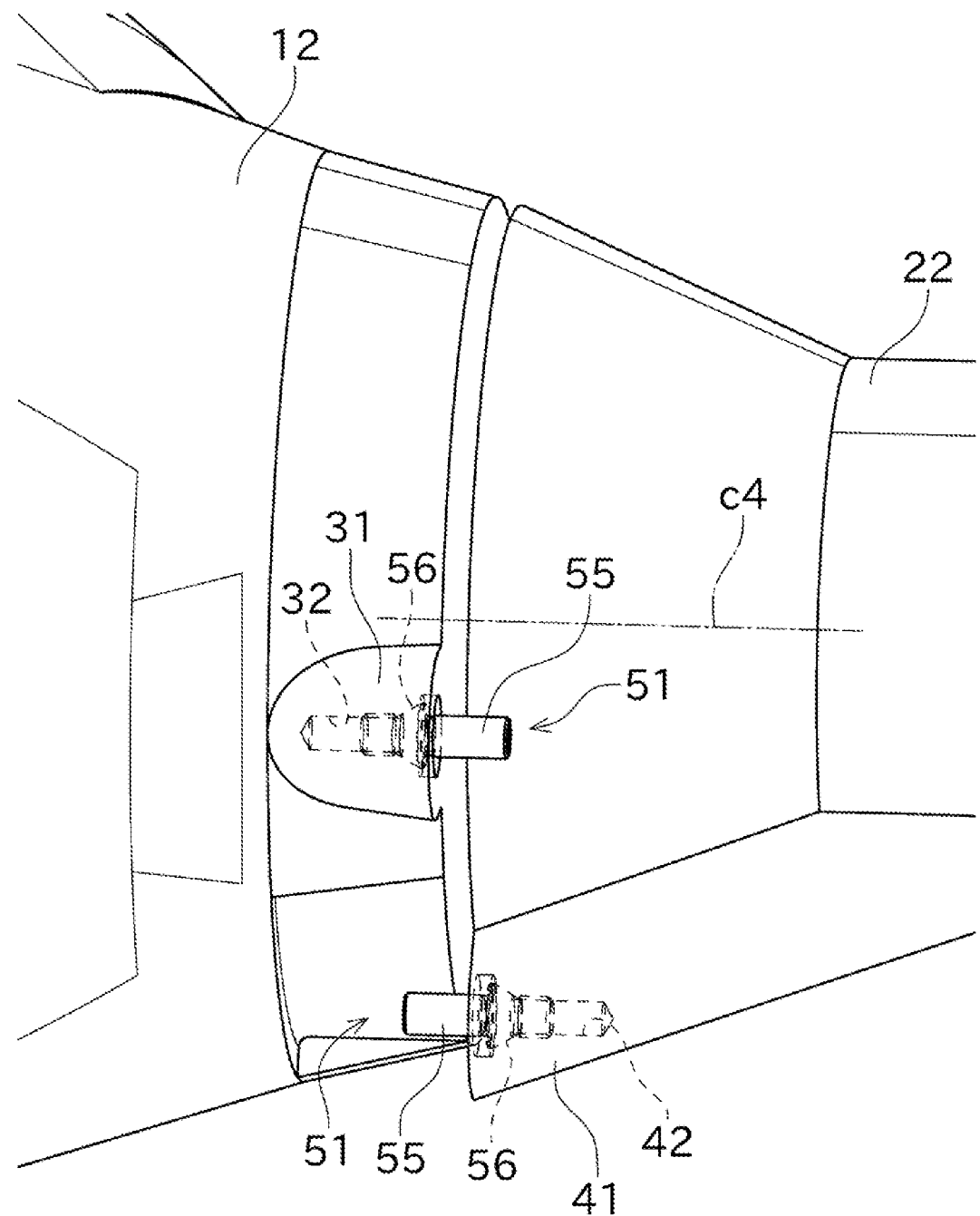

Since the two attachment holes 32, 42 are parallel to each other, the two pins 51 attached thereto are parallel to each other, too. Since the directions of the openings of the attachment holes 32, 42 are different from each other by 180°, the directions in which the two pins 51 protrude from the boss portions 31, 41 are different from each other by 180°, too, as shown in FIG. 3 and FIG. 4. The two pins 51 are identical parts, and therefore their column portions 55 have equal outside diameters.

The two pins 51 are disposed such that their respective centers are at equal distances from the rotation axis c4. In other words, the centers of the two pins 51 are positioned on the same imaginary circle centered at the rotation axis c4. As the angle of the second arm 22 relative to the second joint body 12 changes, the pin 51 in the second arm 22 moves along the imaginary circle. As a result, the central angle corresponding to the two pins 51 changes.

At an appropriate timing after assemblage of the industrial robot 6 is completed and the above-described origin alignment is performed, the distance between outer circumferential wall surfaces of the column portions 55 is measured with the vernier caliper 71 sandwiching the two pins 51, as shown in FIG. 5. At this time, the electric motor for driving the second arm 22 is given a predetermined command value (e.g., 0°). The command value may be any value, but preferably is set such that the two pins 51 are neither too close to nor too far from each other.

The outside diameter of the column portion 55 is known. Accordingly, the distance between the centers of the pins 51 can be obtained by subtracting double the radius of the column portion 55 from the distance between the wall surfaces that were measured with the vernier caliper 71. In this embodiment, this distance between the centers is defined as mark-to-mark distance (measurement object distance). Here, the mark-to-mark distance may be the distance between the wall surfaces instead of the distance between the centers of the pins 51. In this embodiment, the pin center distance thus obtained is recorded as a reference pin center distance (reference mark-to-mark distance, reference measurement object distance) in an appropriate place, in preparation for being referred to later. After the above-described measurement, the two pins 51 are detached, and running of the industrial robot 6 is started.

Here, assumed is a case where the electric motor for rotating the second arm 22 relative to the second joint body 12 is broken down and is replaced with a new electric motor. In this case, after the replacement is completed, the pins 51 are attached to the second joint body 12 and the second arm 22 again, and as shown in FIG. 5, the distance between the outer circumferential wall surfaces of the two pins 51 is measured with the vernier caliper 71. Double the radius of the column portion 55 is subtracted from the distance between the wall surfaces, so that the distance (mark-to-mark distance) between the centers of the pins 51 can be obtained (first step). At this time, the replacing electric motor is given a predetermined command value. The command value may be any value, but preferably is the same command value as the command value (0°) that was given to the replaced electric motor at the initial measurement with the vernier caliper 71, because it makes later calculations easy.

Next, a brief description will be given to a method for obtaining the central angle corresponding to the two pins 51 from a result of the measurement with the vernier caliper 71.

Figure 6:
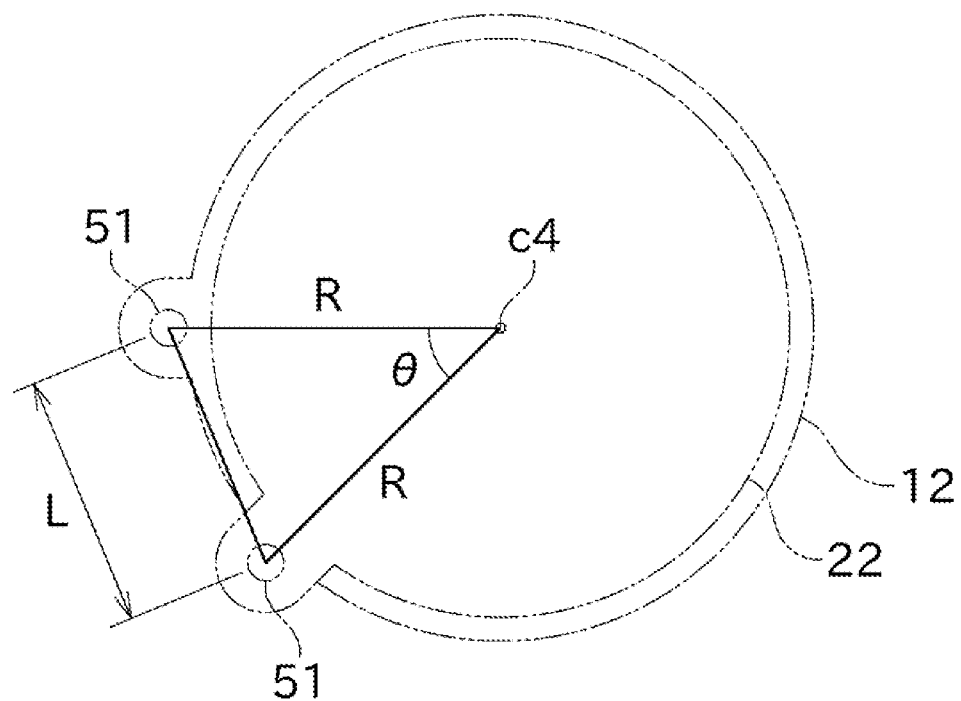

Referring to FIG. 6, the centers of the two pins 51 are at equal distances R from the rotation axis c4 of the second arm 22. Accordingly, the triangle formed by the rotation axis c4 and the centers of the two pins 51 is an isosceles triangle. The vertex angle θ of the isosceles triangle indicates the central angle relative to the two pins 51.

The distance L between the centers of the pins 51 can be obtained from a result of measurement with the vernier caliper 71, as mentioned above.

Generally, in a triangle ABC, a relationship of $\cos \alpha = (b^2 + c^2 - a^2)/(2bc)$ is established, where $a = BC$, $b = CA$, $c = AB$, and $a = \angle CAB$. This is well known as the theorem of cosines. Here, $a = L$, $b = c = R$, and $\alpha = \theta$ are substituted, resulting in $\cos \theta = (1(L^2/2R^2))$. Therefore, $\theta$ can be obtained as $\theta = \arccos(1 - (L^2/2R^2))$.

Next, the origin re-alignment will be described.

Assumed is a case where giving the same command value to the replaced electric motor and the replacing electric motor results in different values of $\theta$. An angular difference $\Delta\theta$ before and after replacing the electric motor can be obtained by calculating the angle $\theta$ in relation to the value of L before the replacement and the angle $\theta$ in relation to the value of L after the replacement (second step). Then, an offset value for the command value, which is required to cancel the angular difference $\Delta\theta$, is calculated (third step). If a command value that will be given to the replacing electric motor is offset by the value thus calculated, a shift in angle of the electric motor before and after the replacement can be eliminated. In this manner, the origin re-alignment can be achieved.

It may be acceptable that the replaced electric motor and the replacing electric motor are given different command values. In such a case, an angle corresponding to the difference in command value needs to be taken into account when the angular difference $\Delta\theta$ mentioned above is calculated.

To perform origin re-alignment, some methods other than the one described in this embodiment may be conceivable.

First, there is a method using a dial gauge. In this method, immediately after initial origin alignment, the dial gauge is fixed at a predetermined position in the arm part 7. In this state, each electric motor of the robot is given an appropriate command value, and the dial gauge is brought into contact with an appropriate frame. A value indicated by the dial gauge at this time is recorded. In origin re-alignment, the dial gauge is fixed at a predetermined position in the robot in the same manner, and the dial gauge is brought into contact with a frame. In this state, the robot is moved little by little, and a command offset value is obtained based on a command value obtained when the dial gauge indicates the same value as that of the initial origin alignment.

This method requires the dial gauge to be fixed in the robot, which tends to make the operation complicated. In addition, in moving the robot little by little, it may sometimes be difficult to make the value of the dial gauge exactly coincident with the initial value, because of a problem of a movement resolution, etc.

Second, there is a method using an inclinometer. In this method, when manufacturing the industrial robot 6, an appropriate surface of the arm part 7 is processed with a high accuracy in advance. Immediately after initial origin alignment, the inclinometer is installed on this surface with an appropriate jig interposed therebetween, and a value indicated by the inclinometer is recorded. In origin re-alignment, the inclinometer is installed in the same manner. Based on a value indicated by this inclinometer, a command offset value is obtained.

In this method, a surface processed with a high accuracy needs to be formed in the arm part 7, which incurs a processing cost. In addition, the surface where the inclinometer is installed is used as a reference in performing origin alignment. The accuracy of origin re-alignment is not always high, therefore.

Third, there is a method using contacting of pins. In this method, pins are attached respectively to two frames (for example, to the second joint body 12 and the second arm 22) that are moving relative to each other. Here, it should be noted that these pins are, unlike the pins 51 described above, attached such that the pins are directly in contact with each other if the two frames form a predetermined angle. Immediately after initial origin alignment, the robot is moved little by little until the pins come into contact, and a command value obtained when the pins come into contact is recorded. In origin re-alignment, the pins are attached in the same manner as in the initial origin alignment, and the robot is moved little by little. Based on a command value obtained when the pins are in contact, a command offset value is obtained.

In this method, a determination of whether or not the pins are in contact is difficult. For example, it is conceivable that a thin sheet is sandwiched between the pins, and whether the pins are in contact is determined based on whether the sheet is moved. This, however, involves a complicated determination operation. In addition, a delicate operation is required, because if the robot is moved too much, the pins may be deformed, which considerably deteriorates the accuracy of origin alignment. Moreover, a pin hole to which the pin is attached is used as a reference in performing origin alignment. The accuracy of origin re-alignment is not always high, therefore. In a case of using an insertion type pin, a gap for allowing the pin to be inserted into a pin hole leads to a deteriorated accuracy of origin re-alignment.

In this respect, the method according to this embodiment makes it possible that the pins 51, which can be manufactured easily, are accurately attached by using the tapered portions 56. In addition, an operation for moving the robot little by little is not necessary, and therefore origin re-alignment can be completed in a short time. Thus, early recovery of the robot can be achieved. Furthermore, since measurement data obtained in initial origin alignment is used as a reference, origin re-alignment can be performed with a high accuracy.

As thus far described, the industrial robot 6 according to this embodiment includes the second joint body 12, the second arm 22, and the electric motor. The second arm 22 is coupled to the second joint body 12 in a relatively rotatable manner. The electric motor changes the angle of the second arm 22 relative to the second joint body 12 in accordance with a command value. An angle re-calibration method performed in this embodiment includes the first step and the second step. In the first step, a pin center distance, which is a distance between the two pins 51 (marks) including a first pin disposed in the second joint body 12 and a second pin disposed in the second arm 22, is obtained by measuring a distance between the wall surfaces of the pins 51, the measurement being made while the electric motor is given an arbitrary command value. In the second step, an angular difference $\Delta\theta$ corresponding to a difference in distance between the centers of the two pins is obtained by calculation based on a reference pin center distance obtained in initial origin alignment and the pin center distance obtained in the first step, the reference pin center distance having been obtained by measuring a pin center distance while the electric motor was given an arbitrary command value.

With this, a command value to be given to the replacing electric motor is adjusted based on the angular difference $\Delta\theta$ thus obtained, and thereby the angle of rotation of the second arm 22 rotated by the replaced electric motor can be reproduced with a good accuracy. It is possible to perform origin re-alignment just by measuring the distance between the wall surfaces of the pins 51, without any need to move the industrial robot 6 little by little. Thus, an improved operation efficiency can be obtained.

In this embodiment, one of the two marks is the pin 51 that is disposed so as to protrude from the second joint body 12. The other is the pin 51 that is disposed so as to protrude from the second arm 22.

Accordingly, a simple configuration for the origin re-alignment can be achieved.

In this embodiment, the directions in which the two pins 51 protrude are opposite to each other.

This can make it easy to measure the distance between the wall surfaces of the pins 51 while shortening the lengths of the pins 51.

In this embodiment, each of the two pins 51 is removable from the second joint body 12 or the second arm 22.

Accordingly, when the industrial robot 6 is run, the pins 51 can be removed so as not to obstruct the running.

In this embodiment, each of the two pins 51 is attached to the attachment hole 32, 42 that is formed in the second joint body 12 or in the second arm 22. The attachment holes 32, 42 are threaded holes.

Accordingly, the pin 51 can be fixed to the second joint body 12 or the second arm 22 with a simple operation of screwing the pin 51.

In this embodiment, each of the two pins 51 has the tapered portion 56. The second joint body 12 or the second arm 22 has the tapered recess 36, 46 corresponding to the tapered portion 56 of the pin 51.

With this, the tapered portion 56 contributes to exertion of axis alignment, which can make the center of the pin 51 strictly coincident with the center of the tapered recess 36, 46. Consequently, the accuracy of origin re-alignment can be enhanced.

In this embodiment, when the column portion 55 of each of the two pins 51 is cut in a plane perpendicular to its axis, a resulting cross-section has a circular contour. The circular contours of the cross-sections of the two pins 51 have equal diameters (in other words, the column portions 55 have equal outside diameters). The column portions 55 of the two pins 51 are at equal distances from the rotation axis c4.

With this configuration, the angle θ corresponding to the two pins 51 can be calculated easily.

In this embodiment, the pin-to-pin distance is measured with the vernier caliper 71 being in contact with the wall surfaces of the respective two pins 51.

Accordingly, the distance can be measured at low cost and with a universal method using the vernier caliper 71.

While a preferred embodiment of the present invention has been described above, the foregoing configuration may be modified, for example, as follows.

The pins 51, if not obstructing running of the industrial robot 6, can be kept attached even after initial origin alignment. Accordingly, at least one of the pins 51 may be unremovably fixed to the second joint body 12 or the second arm 22.

A method other than screwing, such as driving a pin into a taper hole, may be adopted to fix the pin 51 to the second joint body 12 or the second arm 22.

The two pins 51 may be disposed so as to protrude in the same direction, instead of protruding in opposite directions.

If a space for arrangement of the pins 51 serving as the marks can be obtained without forming the boss portions 31, 41, the boss portions 31, 41 may be omitted.

The two pins 51 may have different shapes. For example, the two column portions 55 may have different diameters. At least one of the pins 51 may have a non-circular cross-sectional contour when cut in a plane perpendicular to the rotation axis c4.

The axes of the two pins 51 may be at different distances from the rotation axis c4. In such a case, the triangle is not the isosceles triangle as shown in FIG. 6. It however is possible to calculate the angle θ based on the theorem of cosines, if the distances of the axes of the pins 51 from the rotation axis c4 are known.

Instead of the pins 51, columnar recesses formed in the boss portions 31, 41 may be used as the marks. The columnar shapes of the recesses are disposed with their axes extending in parallel to the rotation axis c4. In such a case, a distance between the centers of the recesses can be obtained by measuring a distance between the inner circumferential surfaces (wall surfaces) defining the recesses with the vernier caliper 71.

An angle calibration method according to the present invention can be performed with respect to arbitrary two members included in the industrial robot 6, the two members being coupled to each other with a joint interposed therebetween.

The angle calibration method according to the present invention is applicable not only to a vertical-type articulated robot, but also to a horizontal-type articulated robot. The angle calibration method according to the present invention is also applicable to a cylindrical coordinate robot or a polar coordinates robot.

REFERENCE SIGNS LIST 6 industrial robot (robot)
12 second joint body (first member)
22 second arm (second member)
31 boss portion
32 attachment hole
36 tapered recess
41 boss portion
42 attachment hole
46 tapered recess
51 pin (mark)
55 column portion
56 tapered portion
71 vernier caliper

The invention claimed is:

1. An angle calibration method for calibrating an angle of a robot, the robot including
a first member,
a second member that is coupled to the first member in a relatively rotatable manner, and
an actuator that changes an angle of the second member relative to the first member in accordance with a command value,
the angle calibration method comprising:
a first step of obtaining a measurement object distance, which is a distance between two measurement object portions including a first measurement object portion in the first member and a second measurement object portion in the second member, by measuring a distance between wall surfaces of the two measurement object portions, the measurement being made while the actuator is given an arbitrary command value; and
a second step of obtaining an angular difference by calculation, the angular difference corresponding to a difference in distance between two measurement object portions, the calculation being made based on a reference measurement object distance obtained in the past and the measurement object distance obtained in the first step, the reference measurement object distance having been obtained by measuring the measurement object distance while the actuator was given an arbitrary command value, wherein one of the two measurement object portions is a pin that protrudes from the first member, the other of the two measurement object portions is a pin that protrudes from the second member, and directions in which the two pins protrude are opposite to each other.

2. The angle calibration method according to claim 1, wherein at least one of the two pins is removable from the first member or the second member.

3. The angle calibration method according to claim 2, wherein at least one of the two pins is attached to a threaded hole that is formed in the first member or in the second member.

4. The angle calibration method according to claim 2, wherein at least one of the two pins has a tapered portion, and the first member or the second member has a tapered recess corresponding to the tapered portion.

5. The angle calibration method according to claim 1, wherein one of the two measurement object portions is a recess formed in the first member, and the other of the two measurement object portions is a recess formed in the second member.

6. The angle calibration method according to claim 1, wherein each of the two measurement object portions is cut in a plane perpendicular to the central axis of the second member, and a resulting cross-section has a circular contour.

7. The angle calibration method according to claim 6, wherein the circular contours of the cross-sections of the two measurement object portions have equal diameters.

8. The angle calibration method according to claim 1, wherein the two measurement object portions are at equal distances from the central axis of the second member.

9. The angle calibration method according to claim 1, wherein in the first step, the measurement object distance is measured with a vernier caliper in contact with wall surfaces of the respective two measurement object portions.

10. An angle calibration method for calibrating an angle of a robot, the robot including a first member, a second member that is coupled to the first member in a relatively rotatable manner, and an actuator that changes an angle of the second member relative to the first member in accordance with a command value, the angle calibration method comprising:

a first step of obtaining a measurement object distance, which is a distance between two measurement object portions including a first measurement object portion in the first member and a second measurement object portion in the second member, by measuring a distance between wall surfaces of the two measurement object portions, the measurement being made while the actuator is given an arbitrary command value; and a second step of obtaining an angular difference by calculation, the angular difference corresponding to a difference in distance between two measurement object portions, the calculation being made based on a reference measurement object distance obtained in the past and the measurement object distance obtained in the first step, the reference measurement object distance having been obtained by measuring the measurement object distance while the actuator was given an arbitrary command value, wherein one of the two measurement object portions is a pin that protrudes from the first member, and the other of the two measurement object portions is a pin that protrudes from the second member, at least one of the two pins is removable from the first member or the second member, at least one of the two pins has a tapered portion, and the first member or the second member has a tapered recess corresponding to the tapered portion.

11. An angle calibration method for calibrating an angle of a robot, the robot including a first member, a second member that is coupled to the first member in a relatively rotatable manner, and an actuator that changes an angle of the second member relative to the first member in accordance with a command value, the angle calibration method comprising:

a first step of obtaining a measurement object distance, which is a distance between two measurement object portions including a first measurement object portion in the first member and a second measurement object portion in the second member, by measuring a distance between wall surfaces of the two measurement object portions, the measurement being made while the actuator is given an arbitrary command value; and a second step of obtaining an angular difference by calculation, the angular difference corresponding to a difference in distance between two measurement object portions, the calculation being made based on a reference measurement object distance obtained in the past and the measurement object distance obtained in the first step, the reference measurement object distance having been obtained by measuring the measurement object distance while the actuator was given an arbitrary command value, wherein each of the two measurement object portions is cut in a plane perpendicular to the central axis of the second member, and a resulting cross-section has a circular contour.

* * * * *